US011859430B2

(12) United States Patent
Krivoy

(10) Patent No.: US 11,859,430 B2
(45) Date of Patent: Jan. 2, 2024

(54) HEAVY DUTY FULL ENERGY, ENCODER DRIVEN NON-HANDED ELECTRIC DOOR OPERATOR

(71) Applicant: Mary Alison Kirkland, Corpus Christi, TX (US)

(72) Inventor: Paul J. Krivoy, Corpus Christi, TX (US)

( * ) Notice: Subject to any disclaimer, the term of this patent is extended or adjusted under 35 U.S.C. 154(b) by 32 days.

(21) Appl. No.: 17/453,340

(22) Filed: Nov. 2, 2021

(65) Prior Publication Data

US 2022/0136311 A1 May 5, 2022

Related U.S. Application Data

(63) Continuation of application No. 29/779,185, filed on Apr. 16, 2021, now Pat. No. Des. 989,140.

(60) Provisional application No. 63/108,503, filed on Nov. 2, 2020.

(51) Int. Cl.
*E05F 15/00* (2015.01)
*E05F 15/63* (2015.01)

(52) U.S. Cl.
CPC ........... *E05F 15/63* (2015.01); *E05Y 2201/10* (2013.01); *E05Y 2201/418* (2013.01); *E05Y 2201/624* (2013.01); *E05Y 2201/706* (2013.01); *E05Y 2201/71* (2013.01); *E05Y 2400/654* (2013.01); *E05Y 2600/626* (2013.01); *E05Y 2900/132* (2013.01)

(58) Field of Classification Search
CPC ...... E05F 15/00; E05F 15/63; E05Y 2201/00; E05Y 2201/10; E05Y 2201/11; E05Y 2201/418; E05Y 2201/422; E05Y 2201/43; E05Y 2201/434; E05Y 2201/622; E05Y 2201/624; E05Y 2201/706; E05Y 2201/71; E05Y 2400/654; E05Y 2600/626; E05Y 2900/132
See application file for complete search history.

(56) References Cited

U.S. PATENT DOCUMENTS 4,333,270 A * 6/1982 Catlett .................. E05F 15/614 49/336
2007/0063536 A1* 3/2007 Okada .................. E05F 15/619 296/146.4
2011/0210540 A1* 9/2011 Knotten .................. F16L 33/01 285/239

(Continued)

*Primary Examiner* — Chi Q Nguyen
(74) *Attorney, Agent, or Firm* — Miguel Villlarreal, Jr.; Gunn, Lee & Cave, P.C.

(57) ABSTRACT

A heavy duty full energy, encoder driven non-handed electric door operator for industrial and commercial use a motor and an encoder configured to receive an external set of predetermined instructions. A motor mounting bracket connects the motor to a multi-layer housing. A controller is in electronic communications with the encoder and transmits external sets of predetermined instructions. Internally, the door operator contains a plurality of transfer shaft assemblies in communication with each other and connected with the motor at one end and an output shaft at the other end. The output shaft terminates at each end in a nondetachable spline. A detachable mounting plate serves as a base. The door operator operates heavy swing doors external to a building where the swing doors are required to be open or remain open in strong wind conditions.

6 Claims, 9 Drawing Sheets

(56) References Cited

U.S. PATENT DOCUMENTS

| | | | | |
|---|---|---|---|---|
| 2015/0007500 | A1* | 1/2015 | Schatz | E05F 15/668<br>49/350 |
| 2021/0017803 | A1* | 1/2021 | McNabb | E05F 15/63 |
| 2021/0025213 | A1* | 1/2021 | Noguchi | B60J 5/047 |
| 2021/0230924 | A1* | 7/2021 | Romero | E05F 15/63 |
| 2021/0238904 | A1* | 8/2021 | Eickhoff | E05F 3/222 |
| 2021/0252597 | A1* | 8/2021 | Narin | F23C 10/00 |
| 2021/0372191 | A1* | 12/2021 | Langenberg | E05F 3/22 |
| 2022/0112758 | A1* | 4/2022 | Krivoy | E05F 15/63 |
| 2022/0243521 | A1* | 8/2022 | Herman | E05F 15/622 |
| 2022/0268074 | A1* | 8/2022 | Leonard | E05F 15/41 |

* cited by examiner

HEAVY DUTY FULL ENERGY, ENCODER DRIVEN NON-HANDED ELECTRIC DOOR OPERATOR

CROSS REFERENCE TO RELATED APPLICATIONS

This original non-provisional application claims priority to and the benefit of U.S. provisional application Ser. No. 63/108,503, filed Nov. 2, 2020, and entitled "Heavy Duty Full Energy, Encoder Driven Non-Handed Electric Door Operator," and to design patent application Ser. No. 29/779,185, filed Apr. 16, 2021, both of which are incorporated by reference herein.

STATEMENT REGARDING FEDERALLY SPONSORED RESEARCH OR DEVELOPMENT

None.

BACKGROUND OF THE INVENTION

1. Field of the Invention

The present invention relates to a door operator. More specifically, the present invention relates to a heavy duty full energy, encoder driven non-handed electric door operator for industrial and commercial use.

2. Description of the Related Art

There exists in the prior art automated door opening units (called "operators") used to operate swing doors. Many businesses and public buildings incorporate these operator mechanisms or devices to their swing doors which may also generally be connected to a sensor (e.g., motion sensor, push button, etc. . . . ) which may be used by the user to then open the doors. Opening of the doors may either be by swinging a door inward to the left or to the right or even swinging a door outward to the left or to the right.

The door operators may be designated as a "left-hand" unit (and "LH" unit), which causes and in swing on a left-hand door; (2) a "left-hand reverse" unit (and "LHR" unit), which causes an out swing on a left-hand door; (3) a "right-hand" unit (and "RH" unit), which causes an in swing on a right hand door; and (4) a "right-hand reverse" unit (and "RHR" unit), which causes announcement on a right-hand door.

These several variations of door operators forces a service technician to always carry several variations in inventory and on hand when going to do a repair. This is because the service technician never knows which of the door operators (LH, LHR, RH, RHR) may be faulty.

The inventor previously solved this problem by inventing a non-handed swing door operator, or "universal" door operator, as described in U.S. Pat. No. 8,720,113, issued May 13, 2014, and incorporated by reference herein. While the device in U.S. Pat. No. 8,720,113 has proven effective, the inventor has since become aware of certain shortcomings.

Some shortcomings of the device in U.S. Pat. No. 8,720,113 included that the drive gear/spline kept breaking off. A main shaft traverses the device and is to what external removable drive gears/splines attach to secure an arm (which connects to and opens and closes a swing door) to the device via the shaft.

The inventor discovered that the drive gear/spline ends were subject to breaking off requiring repair of the operator. The inventor discovered the reason for the breakage was because during the fabrication stage of the shaft, the shaft had to be hollowed out. After this was done, there was only approximately 1/16" of material left. Consequently, the hollowing out process weakened the spline.

Another concern for the inventor was the use of cams and switch assemblies. The door operator of U.S. Pat. No. 8,720,113, uses cams to activate the switch. However, over time, rotational alignment of the cams can slip, necessitating realignment to ensure proper operating range of the swing door. Adjustments were made manually, generally requiring the use of a screwdriver tip or other comparable tool to make the adjustments. This means if the door operator required realignment, a service technician would need to be dispatched to perform the alignment.

Finally, the door operator of U.S. Pat. No. 8,720,113 would not be as effective for use in larger, heavier swings doors such as ones found in hospitals and other larger buildings where the swing doors are external to the building and must open or remain open even in strong wind conditions.

Therefore, there is a need for a heavy duty full energy, encoder driven universal non-handed door operator with a robust main drive shaft and an internal encoder motor and controller that is a more user-friendly, cost-efficient, programmable, reliable and accurate device for use in larger, heavier swings doors.

BRIEF SUMMARY OF THE INVENTION

Figure 1:
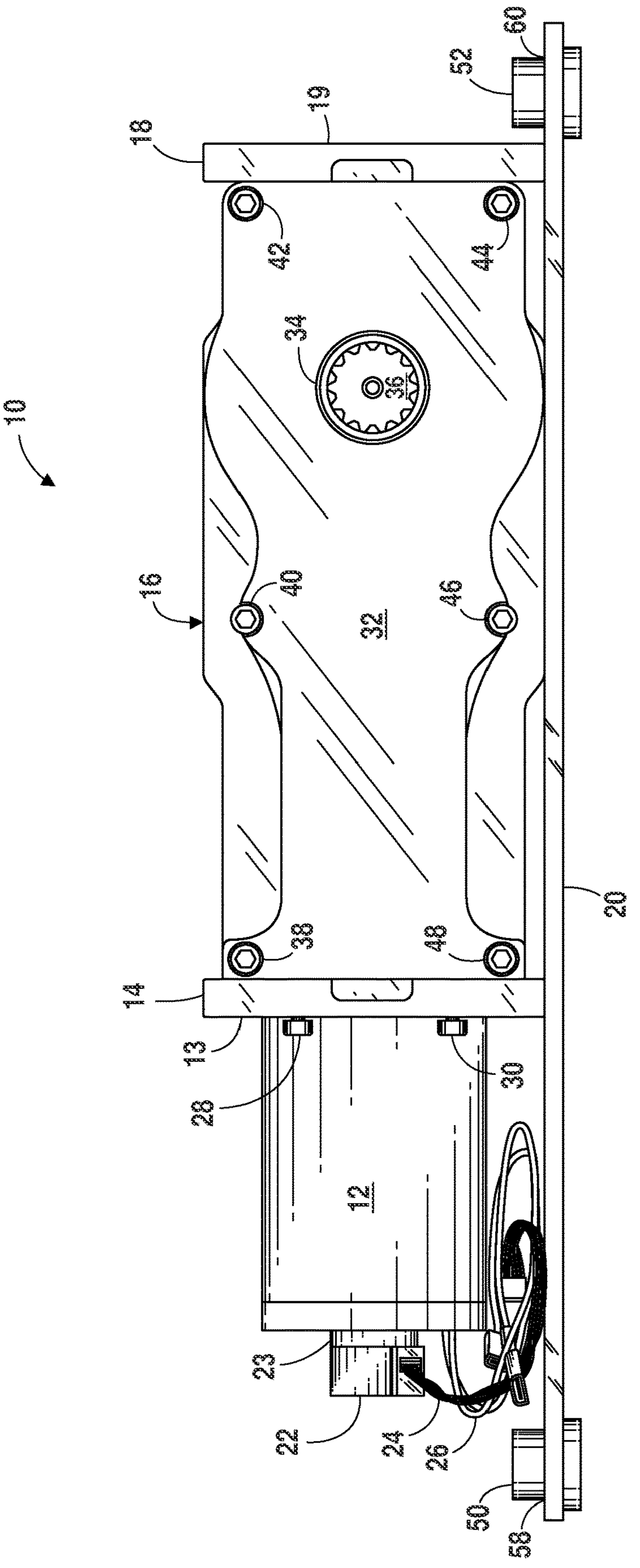
FIG. 1 shows a front view of an embodiment of the present invention.

The present invention is a heavy duty full energy, encoder driven non-handed electric door operator. The present invention includes a motor having an internal encoder, a controller, and a single solid drive gear.

More particularly, the present invention is a heavy duty full energy, encoder driven non-handed electric door operator comprising: a motor having a first end and a second end and an encoder configured to receive an external set of predetermined instructions; a motor mounting bracket connected to said motor at said second end of said motor; a multi-layer housing connected to said motor mounting bracket, said multi-layer housing further comprising a front housing plate, a middle housing plate and a back housing plate; a housing mounting bracket connected to said multi-layer housing; a controller in electronic communications with said motor, said controller for transmitting said external set of predetermined instructions to said encoder of said motor; a first transfer shaft assembly in connection with said motor, said first transfer shaft assembly having a first transfer gear and a first transfer shaft; a second transfer shaft assembly having a second transfer gear and a second transfer shaft, said second transfer shaft assembly in connection with said first transfer shaft assembly; a third transfer shaft assembly having a third transfer gear and a third transfer shaft, said third transfer shaft assembly in connection with said second transfer shaft assembly; an output shaft and output gear in connection with said third transfer shaft assembly, said output shaft having a first end and a second end wherein each of said first end of said output shaft and said second end of said output shaft terminates in a nondetachable spline; and a mounting plate detachably connected to said motor mounting bracket and said multi-layer housing; said heavy duty full energy, encoder driven non-handed electric door operator for operating heavy swing doors external to a building, said heavy swing doors required to be open or remain open in strong wind conditions.

The encoder driven non-handed door operator of the present invention results in fewer components and renders the present invention a robust, reliable, user-friendly, cost-efficient, programmable, and accurate device. Further, the present invention is effective for use in larger, heavier swings doors such as ones found in hospitals and other larger buildings where the swing doors may are external to the building and must open or remain open, especially even in strong wind conditions.

A housing contains the components of the present invention. The housing is die cast which insures exact fit, faster assembly and closer gear tolerances. A spring adjusting bolt has three tension adjustments, facilitating pre-tensioning of the spring.

The encoder driven non-handed electric door operator of the present invention may either be low or high energy, depending on the swing door used. For purposes of this application, the present invention discussed is for use as a low energy operator. The present invention is a heavy duty door operator used at the exterior of a building and withstands strong wind loads. The door operator of the present invention is used for large doors, such as hospitals.

DETAILED DESCRIPTION OF THE INVENTION

The heavy duty full energy, encoder driven non-handed electric door operator of the present invention includes a motor having an internal encoder, a controller, an internal spring, and a single solid drive gear resulting in fewer components and rendering the present invention a more robust, reliable, user-friendly, cost-efficient, programmable, and accurate device than its predecessor.

The heavy duty low or full energy, non-handed swing door operator is configurable to accommodate right hand and left hand pull as well as right hand and left hand pull. In other words, one heavy duty low or full energy, non-handed swing door operator replaces four (4) prior art "handed" (e.g., fixed as either a LH unit, LHR unit, RH unit, or RHR unit) swing door operators.

The present invention has one spline extending distally from the gear box on one side, and a separate spline on the opposite side also extending distally from the gear box (a "double spline" configuration). The splines are solid steel reducing the event of shearing off that is inherent in the bolt on splines. This solid spline is less likely to break off because the spline is not hollowed out but rather consists now of solid steel. The solid steel is an integral part of the last drive gear in the box. The present invention is die cast.

The present invention further eliminates the use of cams. Instead, the present invention replaces the cams with an intelligent encoder (e.g., to count the revolutions). More particularly, the motor of the present invention has an internal encoder that counts revolutions and calculates the amount that the cams were doing, but does so automatically and in real-time.

A controller connected to the motor may be pre-programmed with a set of instructions to operate the door operator as desired (e.g., how far the door should swing open before it stops? When the door should stop? How long the door is to be held in an open position? How fast the door should swing open? How fast the door should swing closed?). The encoder motor reduces or eliminates the need for a large wiring harness.

The controller is in communication with the encoder. The controller is programmed with a set of instructions (e.g., time to open, the rate that the door is opening, when during the opening phase the door slows down, at what time after opening begins is the door stopped, at what time does the door begin to close, the rate of closure and the time for the door to become fully closed). There are several other types of instructions, including, but not limited to whether the user could open the door by just pushing the door and having the door being held opened after the door opens.

The present invention may include any number of sensors or inputs used to actuate the door operator and open the swing door. These sensors include a mat that detects when weight is being placed thereon (the mat being in front of the door), such mat having motion sensors that sense when someone is approaching the door. However, the sensor will not work if another sensor on the opposite side of the door detects that there is someone on the other side of the swing door. Other types of sensors or inputs to open the swing door include a touch pad button and simply just pushing the swing door open.

A number of redundancies may be included for safety measures. These redundancies include, but are not limited to, increasing the number of laser beams used by the motion detectors to detect individuals the closer they get to the door to avoid the door from closing on them. There will be, however, a balance to be made, as increasing the number of laser beams also significantly increases the costs necessary to incorporate those additional safety features.

The plate used to mount the door operator of the present invention is a reversible mounting plate such that it can be used in four different configurations and also retrofitted to other branded door operators.

The single mounting plate has rubber mounts thereon at each corner. The mounting plate is removable to use on the opposite side of a gear box. This is done via removal and replacement of a plurality of fasteners. The present invention uses six (6) screws, though other amounts and types of fasteners (e.g., rivets, bolts, etc. . . . ) may be used and still be within the contemplation of the present invention. This process of removing the mounting plate to use on the opposite side of a gear box provides for the universal or non-handedness of the present invention. It is the only mechanical change needed to change configurations. The plate will only bolt or securely attach on one way.

An internal clock spring eliminates the separate need for a spring retainer. Moreover, use of an internal clock facilitates the installation process. Assembly is easier because the gear boxes are all assembled the exact same way.

Referring now to FIG. 1, heavy duty door operator or gear box is comprised of motor 12 attached to motor mounting bracket 14 at end 13. Motor mounting bracket 14, in turn, is removably attached to multi-layered housing 16 via fasteners 28. The present invention uses socket head cap screws. However, other comparable and robust fasteners may be used and still be within the contemplation of the present invention.

Housing mounting bracket 18 then removably attaches to multi-layered housing 16 at end 19. Bottom mounting plate 20 serves as a base. Bottom mounting plate 20 is reversible such that regardless of the configuration of the that is using the present invention is used on, the present invention will retrofit the door simply by attaching bottom mounting plate 20 to the top of heavy duty door operator or gear box 10. Rubber mounts 50 and 52 (only two are shown in FIG. 1) traverse the corners of bottom mounting plate 20 via apertures 58 and 60, as shown in FIG. 1.

Still referring to FIG. 1, front housing plate 32 of multi-layered housing 16 is shown attached via a plurality of fasteners (38, 40, 42, 44, 46, 48). Spline 36 of output shaft (not shown) traverses aperture 34 of front housing plate 32. An arm (not shown) connects to spline 36 at one end and to the door at the other end upon which the present invention is attached. Motor 12 terminates in electrical wiring 24 and 26 within lip 23 and protected via cap 22, as shown in FIG. 1.

Figure 2:
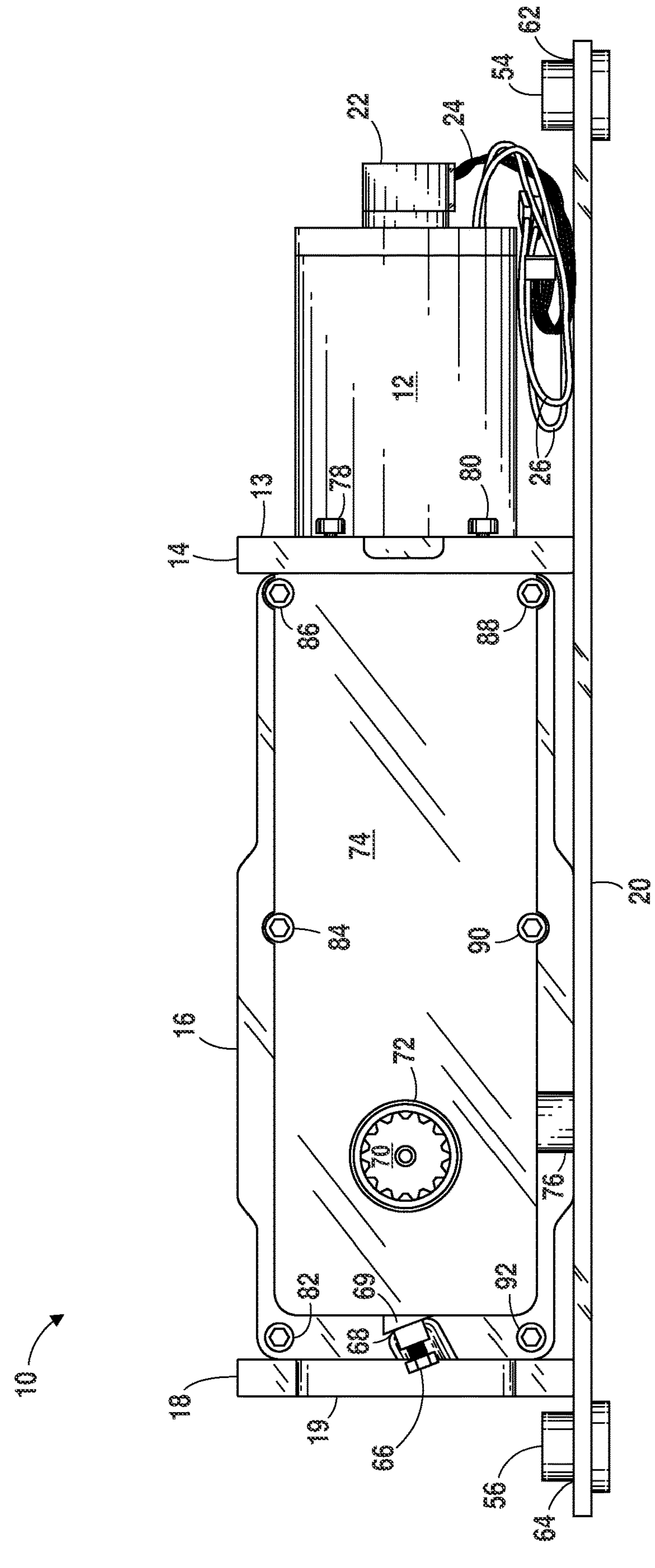
FIG. 2 depicts a back view of an embodiment of the present invention.

Referring now to FIG. 2, the back side of the present invention is shown. Reversible bottom mounting plate 20 contains rubber mounts 54 and 56 which traverse apertures 62 and 64, respectively, of reversible bottom mounting plate 20. Fasteners 78 and 80 secure motor 12 to motor mounting bracket 14 at end 13. Multi-layered housing 16 connects to motor mounting bracket 14 at one end and to housing mounting bracket 18 at the other end. Back housing plate (or member) 74 is shown having spline 70 extending therefrom via aperature 72. A plurality of fasteners (84, 86, 88, 90) secure back housing plate 74 to multi-layered housing 16.

Still referring to FIG. 2., two stop bolt assembly 66, comprised of bolt 66A and nut 66B attach to back housing plate 74 of multi-layered housing 16 via protruding portion 69. Screw 76 provides support for middle housing plate 112 (not shown).

Figure 3:
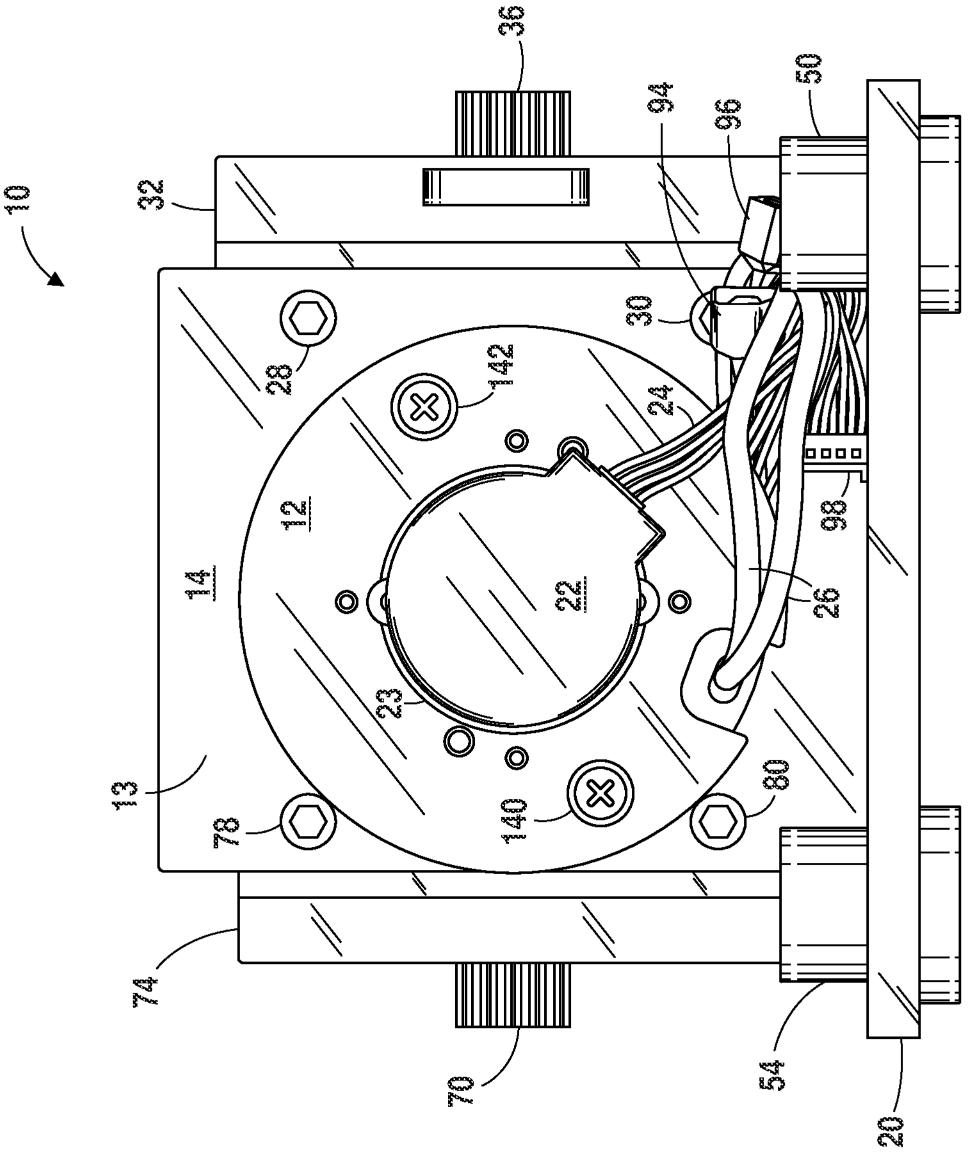
FIG. 3 shows a left side view of an embodiment of the present invention.

Now turning to FIG. 3, the left side of the present invention is shown. The cover of motor 12 is secured via screws 140 and 142. Cap 22 is in a closed position (but may be opened via a hinge to access the contact points of the wiring with motor 12). Cap 22 rests snuggly within lip 23. Connection ends 94, 96 and 98 connect to controller (not shown) to receive set(s) of instructions transmitted from controller to encoder (not shown). A plurality of fasteners (78, 28, 30, 80) secures motor 12 to motor mounting bracket 14. Splines 36 and 70 are shown extending distally from heavy duty gear box 10. Front housing plate 32 and back housing plate 74 of multi-layered housing 16 are shown.

Figure 4:
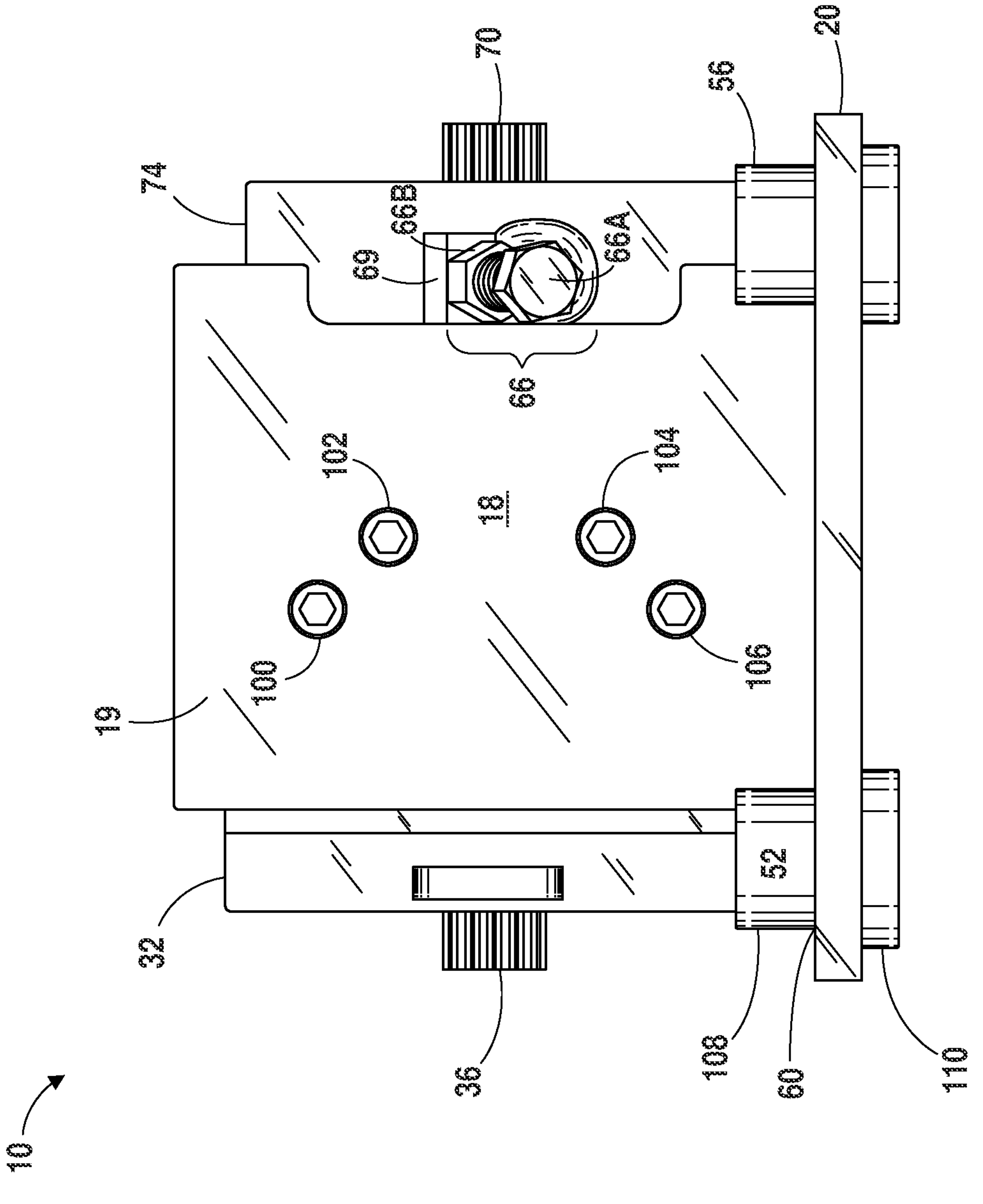
FIG. 4 depicts a right side view of an embodiment of the present invention.

Referring now to FIG. 4, the right side of an embodiment of the present invention is shown. A plurality of fasteners (100, 102, 104, 106) secure housing mounting bracket 18 to multi-layered housing 16. Two stop bolt assembly 66 used to adjust the tension of the interior coil spring (not shown) is shown. Again, front housing plate 32 (and spline 36 extending therefrom) and back housing plate 74 (and spline 70 extending therefrom) of multi-layered housing 16 are shown. The rubber mounts are of a configuration that may traverse plate 20 then remain secured in place. For example, a more narrower in diameter upper portion 108 of rubber mount 52 traverses plate 20 while the more wider in diameter lower portion 110 cannot pass through aperture 60 and thus remains under bottom plate 20.

Figure 5:
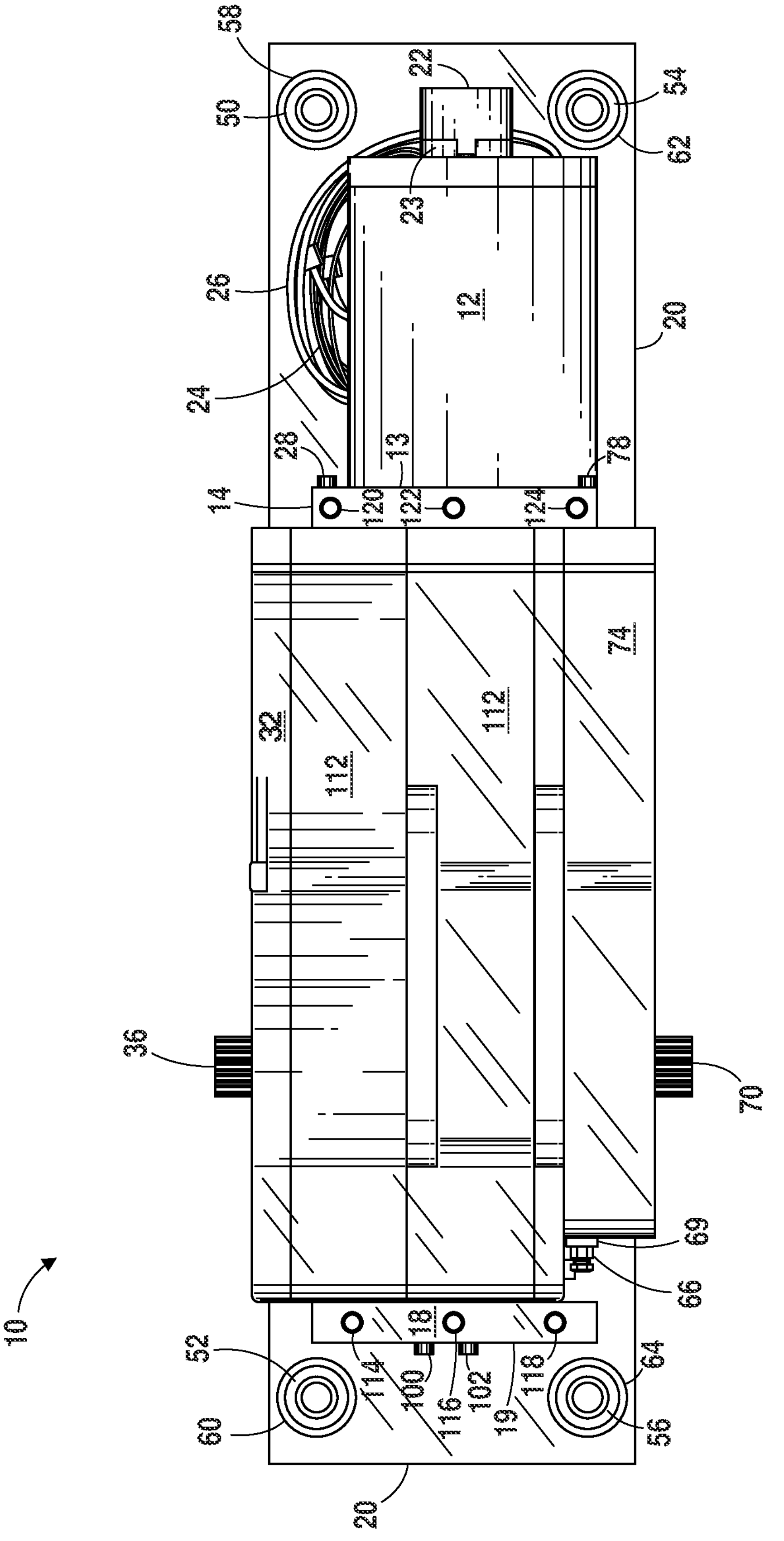
FIG. 5 shows a top view of an embodiment of the present invention.

Now turning to FIG. 5, the top view of the present invention shows the three plates of the multi-layered housing. These are front housing plate 32, middle housing plate 112 and back housing plate 74. Front housing plate 32 is the most narrow followed by a wider back housing plate 74. Middle housing plate 112 is the widest of all plate layers.

Figure 6:
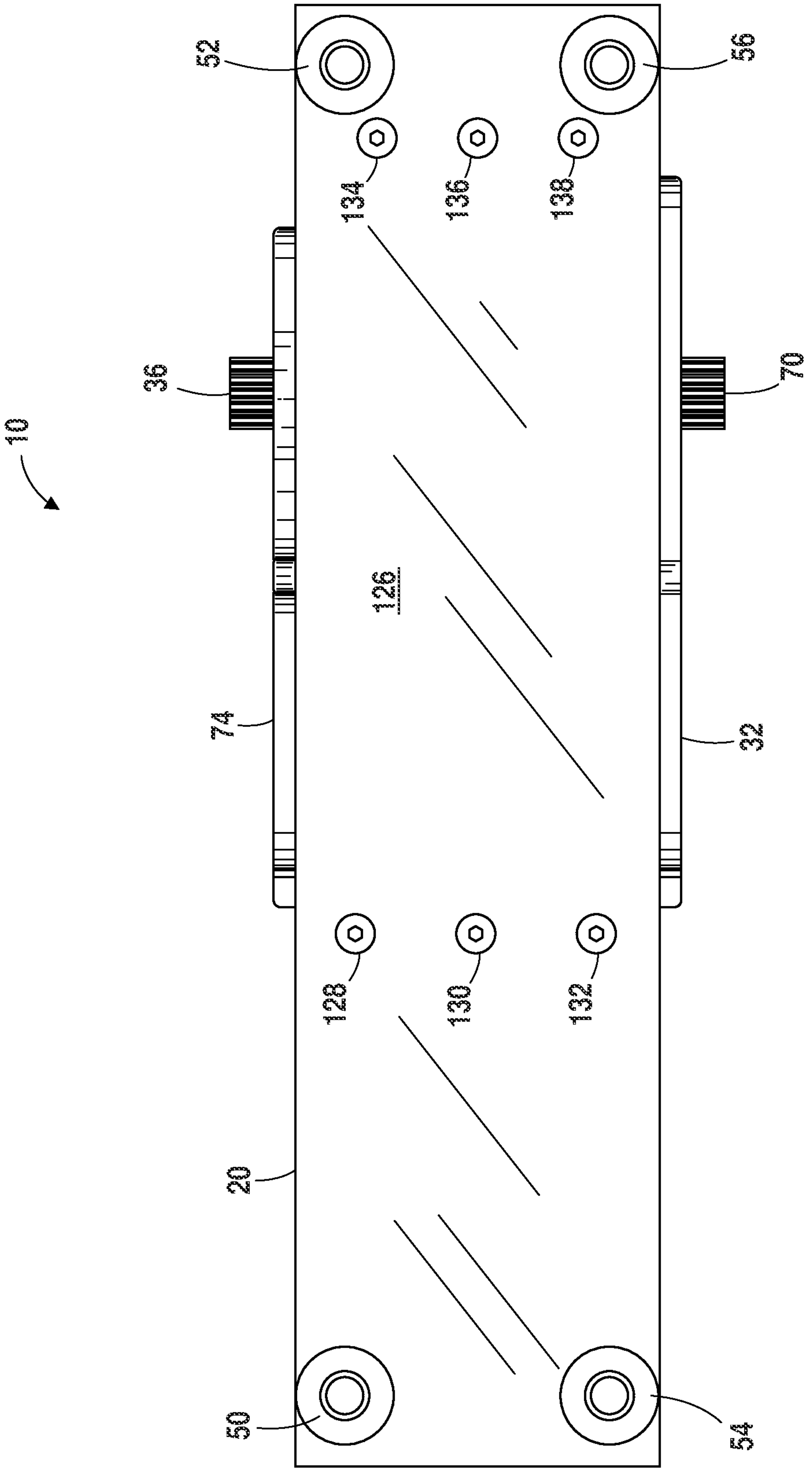
FIG. 6 shows a bottom view of an embodiment of the present invention.
Figure 7:
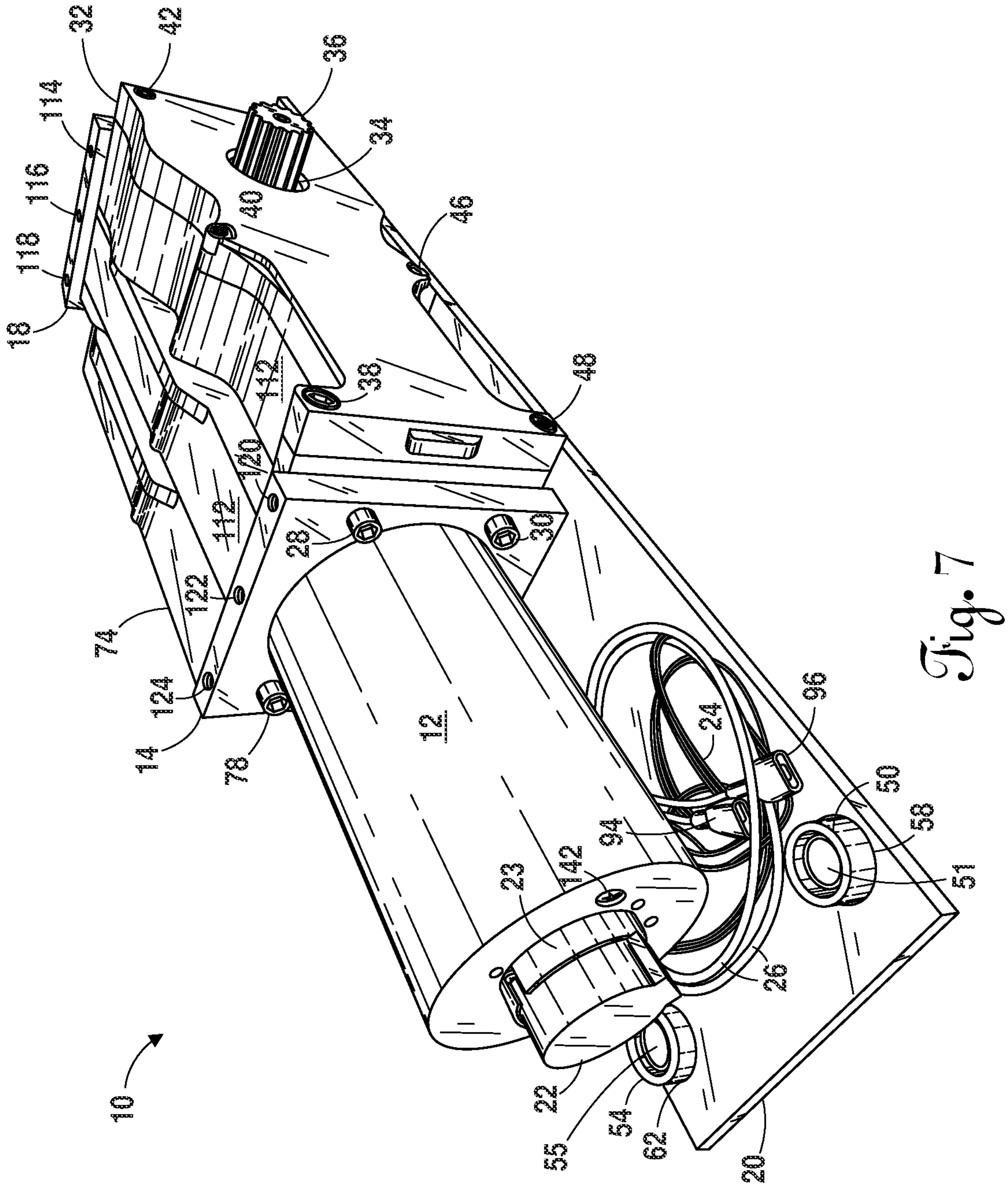
FIG. 7 is a front left perspective view of the present invention.
Figure 8:
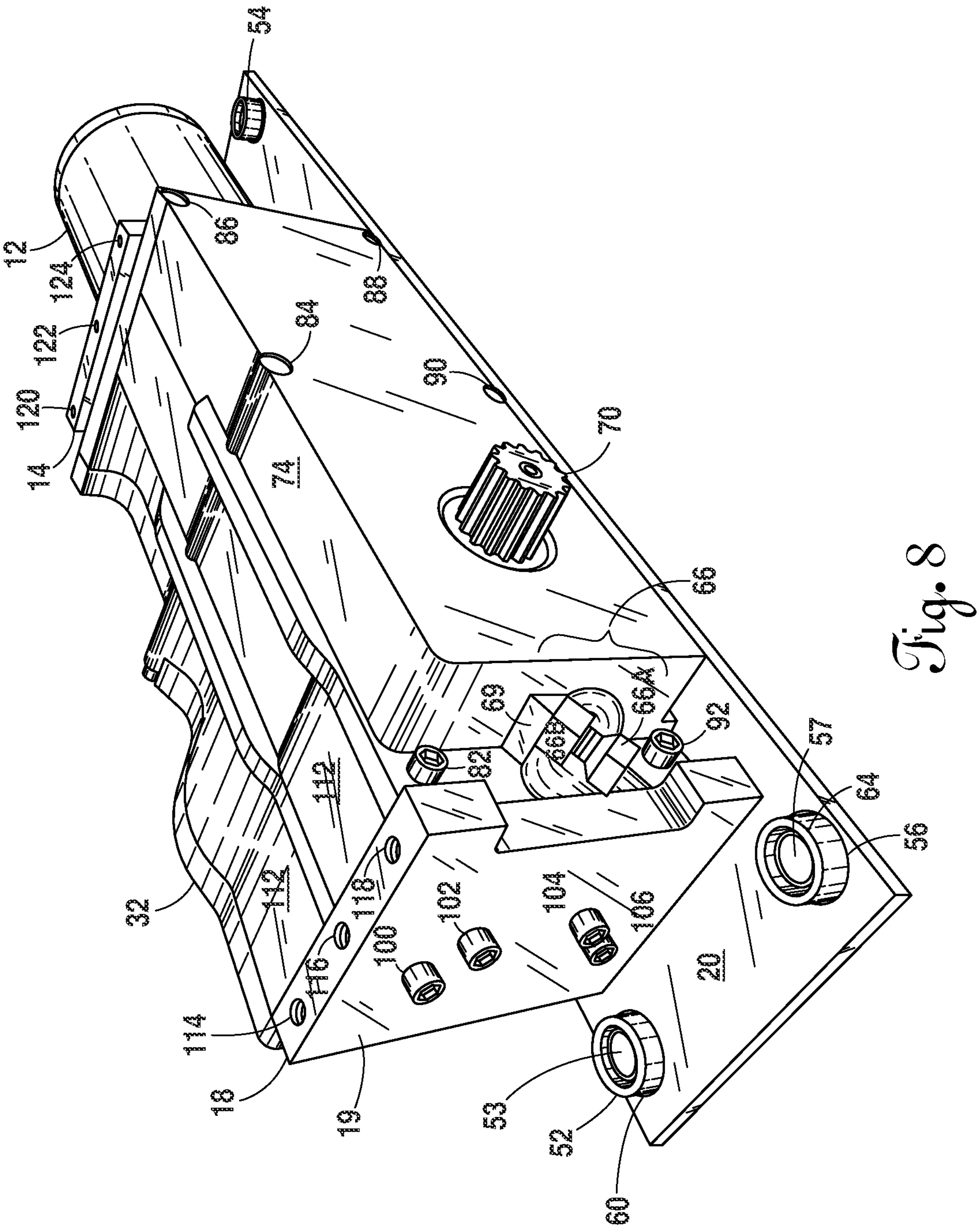
FIG. 8 is a back right perspective view of the present invention.

Turning now to FIG. 6, plurality of fasteners (128, 130, 132) secures motor mounting bracket 14 to bottom mounting plate 20. Similarly, plurality of fasteners (134, 136, 138) secures housing mounting bracket 18 to bottom mounting plate 20. Motor mounting bracket 14 and housing mounting bracket 18 may be used in either direction as apertures (114, 116, 118, 120, 122, 124) therein traverse the entire length of each bracket and thus may be secured via fasteners on either side, as shown in FIGS. 7 and 8.

Figure 9:
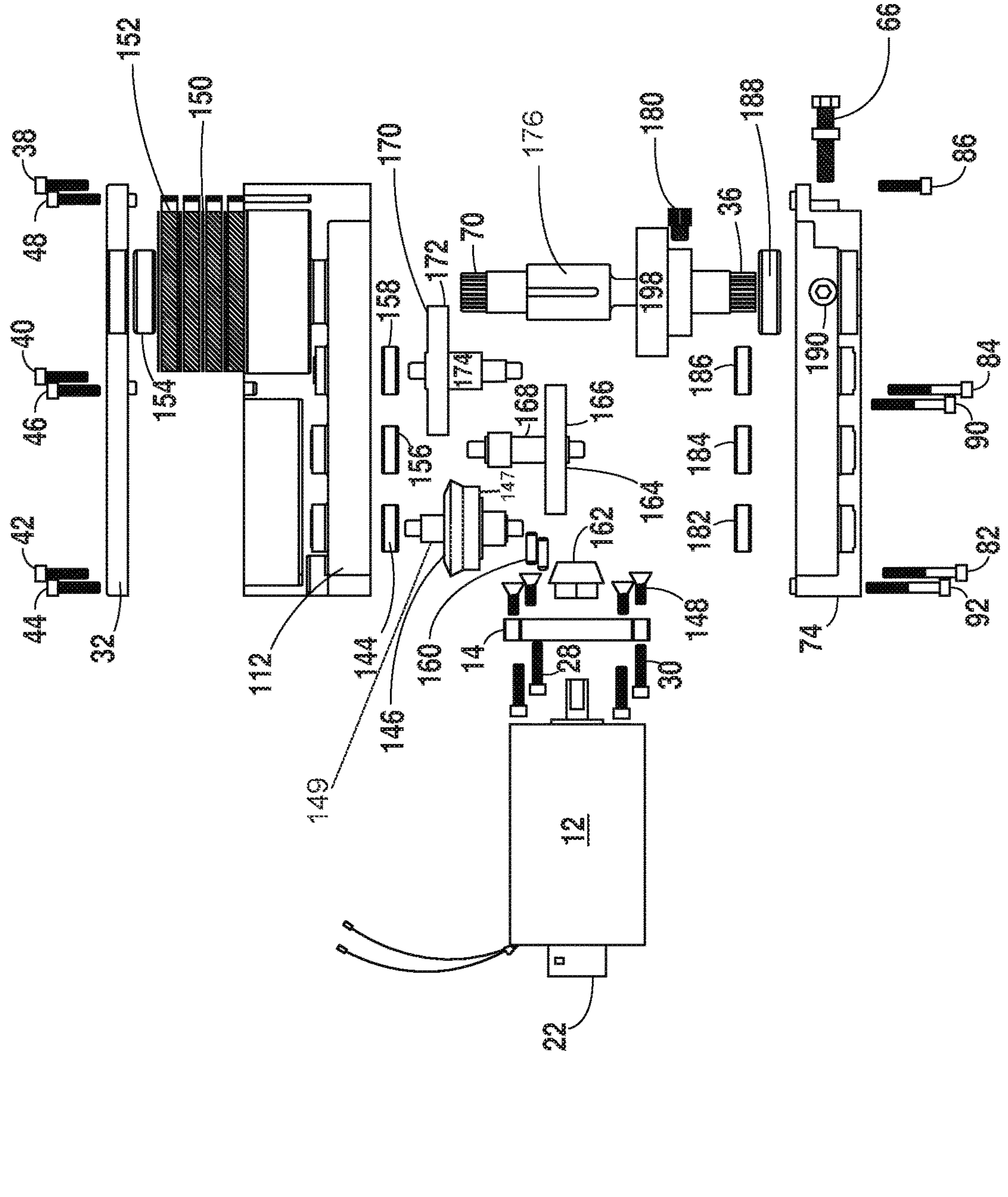
FIG. 9 is an exploded view showing the various components of an embodiment of the present invention.

Turning now to FIG. 9, an exploded view depicting all of the components of the present invention is shown. Motor 12 connects to a first transfer shaft assembly 146 having first transfer gear 147 and first shaft 149 and connected to bearing 144. Second transfer shaft assembly 164 having second gear 166 and second shaft 168 and connected to bearing 156 connects to first transfer shaft assembly 146. Third transfer shaft assembly 170 having third gear 172 and third shaft 174 connects to bearing 158 and connects to second transfer shaft assembly 164. Third transfer shaft assembly 170 connects to output shaft 176. Output shaft 176 is permanently connected to (and comprised of a solid material, i.e., steel) gear 198 and terminating at either end as splines 36 and 70. Each of splines 36 and 70 traverse bearings and terminate extending distally such that an arm may be connected to either side, depending on which way a swing door is desired to swing.

The heavy duty low or full energy, non-handed swing door operator of the present invention provides predictability, reliability, robustness and better programmability to door operators.

While the present invention is described as being electrically connected to the controller for the door operator, the present invention may also be wireless and send and receive signals via Bluetooth® or other comparable wireless technology platform.

To operate the gear box, several gears and corresponding shafts work synergistically. For example, a motor spiral bevel gear turns a first spiral bevel gear. The first spiral bevel gear is attached to a first shaft. The first shaft then turns a second gear. The second gear is attached to a second shaft. The second shaft turns a third gear. The third gear is attached to a third shaft. The third shaft turns a fourth gear. The fourth gear is welded to a main shaft with splines on both sides allowing installation of the arms on either side of the present invention.

The present invention has application in the medical industry, such as swing doors used in hospitals (e.g., admittance or emergency room, surgery, recovery areas). However, it is contemplated that the present invention may also have application in other areas such as hotels, restaurants, commercial buildings and warehouses, where large doors require automatic opening to, for example, allow physically impaired individuals easy access into such structures (where it may be difficult otherwise) or to allow large items to be pushed through on rollers where individuals are handling the deliverables and such encoder driven non-handed door operators facilitate passing through a single swing door or even double swing doors such as ones found in hospitals and other larger buildings where the swing doors are external to the building and must open or remain open even in strong wind conditions.

Wind speeds of about 19 mph or more tend to prevent swing doors from either opening or keeping them from closing due to the amount of force the wind exerts on the swing doors. Strong wind conditions are when winds are sustained at 25 mph or higher for an extended period of time. The present invention is robust enough to overcome such forces and open, keep open and/or close swing doors in such conditions.

The present invention reduces the number of components required to perform the functions of the door operator. Fewer components means fewer areas for failure of the device, and thus also translates to less inventory and reduced or eliminated repair costs—because there are less components which can fail—yielding a cost savings to the users.

The various embodiments described herein may be used singularly or in conjunction with other similar devices. The present disclosure includes preferred or illustrative embodiments of specifically described apparatuses, assemblies, and systems. Alternative embodiments of such apparatuses, assemblies, and systems can be used in carrying out the invention as described herein. Other aspects and advantages of the present invention may be obtained from a study of this disclosure and the drawings.

I claim:

1. A heavy duty full energy, encoder driven non-handed electric door operator comprising:

- a motor having a first end and a second end and an encoder configured to receive an external set of predetermined instructions;
- a motor mounting bracket connected to said motor at said second end of said motor;
- a multi-layer housing connected to said motor mounting bracket, said multi-layer housing further comprising a front housing plate, a middle housing plate and a back housing plate;
- a housing mounting bracket connected to said multi-layer housing;
- a controller in electronic communications with said motor, said controller for transmitting said external set of predetermined instructions to said encoder of said motor;

- a first transfer shaft assembly in connection with said motor, said first transfer shaft assembly having a first transfer gear and a first transfer shaft;
- a second transfer shaft assembly having a second transfer gear and a second transfer shaft, said second transfer shaft assembly in connection with said first transfer shaft assembly;
- a third transfer shaft assembly having a third transfer gear and a third transfer shaft, said third transfer shaft assembly in connection with said second transfer shaft assembly;
- an output shaft and output gear in connection with said third transfer shaft assembly, said output shaft having a first end and a second end wherein each of said first end of said output shaft and said second end of said output shaft terminates in a nondetachable spline; and
- a mounting plate detachably connected to said motor mounting bracket and said multi-layer housing; said heavy duty full energy, encoder driven non-handed electric door operator for operating heavy swing doors external to a building, said heavy swing doors required to be open or remain open in strong wind conditions.

2. The heavy duty full energy, encoder driven non-handed electric door operator, as recited in claim 1, further comprising a plurality of rubber mounts traversing each corner of said mounting plate.

3. The heavy duty full energy, encoder driven non-handed electric door operator, as recited in claim 2, wherein said first end of said output shaft extend distally from said back housing plate and said second end of said output shaft extend distally from said front housing plate.

4. The heavy duty full energy, encoder driven non-handed electric door operator, as recited in claim 3, further comprising an arm attached to said door via said nondetachable spline of said shaft.

5. The heavy duty full energy, encoder driven non-handed electric door operator, as recited in claim 4, wherein said controller is in electronic communications with said first end of said motor via wiring.

6. The heavy duty full energy, encoder driven non-handed electric door operator, as recited in claim 4, wherein said controller is in electronic communications with said first end of said motor via wiring.

* * * * *